US012403808B2

(12) United States Patent
Skinner et al.

(10) Patent No.: US 12,403,808 B2
(45) Date of Patent: Sep. 2, 2025

(54) VEHICLE CONSOLE ASSEMBLY

(71) Applicant: Ford Global Technologies, LLC, Dearborn, MI (US)

(72) Inventors: Glen D. Skinner, Westland, MI (US); Kevin Robert Chauvin, Belleville, MI (US); Ryan Welch, Ottawa Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 18/079,946

(22) Filed: Dec. 13, 2022

(65) Prior Publication Data

US 2024/0190320 A1   Jun. 13, 2024

(51) Int. Cl.
*B60N 3/00* (2006.01)
*B60N 2/75* (2018.01)
*B60R 7/04* (2006.01)

(52) U.S. Cl.
CPC ............. *B60N 3/002* (2013.01); *B60N 2/773* (2018.02); *B60N 2/79* (2018.02); *B60R 7/04* (2013.01)

(58) Field of Classification Search
CPC .......... B60N 3/002; B60N 2/773; B60N 2/79
See application file for complete search history.

(56) References Cited

U.S. PATENT DOCUMENTS

| | | |
|---|---|---|
| 5,547,247 A | 8/1996 | Dixon |
| 6,032,587 A | 3/2000 | Salenbauch et al. |
| 6,220,660 B1 | 4/2001 | Bedro et al. |
| 6,419,314 B1* | 7/2002 | Scheerhorn ............ B60N 2/773 312/324 |
| 6,793,281 B2 | 9/2004 | Duerr et al. |
| 7,293,507 B2 | 11/2007 | DePue et al. |
| 8,540,297 B2 | 9/2013 | Browne et al. |
| 9,896,011 B2 | 2/2018 | Kong et al. |
| 10,457,170 B2 | 10/2019 | Line et al. |
| 10,457,171 B2 | 10/2019 | Line et al. |
| 2013/0008930 A1 | 1/2013 | Hipshier et al. |

(Continued)

FOREIGN PATENT DOCUMENTS

| | | |
|---|---|---|
| DE | 102019130142 A1 | 5/2021 |
| JP | 2005193855 A1 | 7/2005 |

(Continued)

OTHER PUBLICATIONS

Machine translation of DE 201019130142 to Huf et al., original document published May 12, 2021. (Year: 2021).*

*Primary Examiner* — Daniel J Colilla
(74) *Attorney, Agent, or Firm* — Vichit Chea; Price Heneveld LLP

(57) ABSTRACT

A vehicle console assembly includes a body that defines a storage space. The body includes an upper rim. A support assembly is operable between a first position at one end of the upper rim and a second position at a second end of the upper rim. The support assembly is operable between a folded armrest condition and a deployed tray condition. An actuation assembly is operably coupled to the support assembly. The actuation assembly includes at least one cable having coils. The at least one cable is coupled to the support assembly. A motor is configured to engage the coils of the at least one cable to translate the support assembly between the first position and the second position.

20 Claims, 10 Drawing Sheets

(56) References Cited

U.S. PATENT DOCUMENTS

2018/0072209 A1 3/2018 Farooq et al.
2022/0371494 A1* 11/2022 Mergl .................. B60R 16/037

FOREIGN PATENT DOCUMENTS

| JP | 5715268 B2 | 5/2015 | |
|---|---|---|---|
| WO | WO-2005054006 A2 * | 6/2005 | ............. B60N 2/464 |
| WO | 2012174613 A1 | 12/2012 | |

* cited by examiner

VEHICLE CONSOLE ASSEMBLY

FIELD OF THE DISCLOSURE

The present disclosure generally relates to a console assembly. More specifically, the present disclosure relates to a console assembly for a vehicle.

BACKGROUND OF THE DISCLOSURE

Many vehicles include center consoles. The center consoles often provide a storage cavity for housing and storing items. Additionally, the center consoles often have a cover that includes a padded layer.

SUMMARY OF THE DISCLOSURE

According to at least one aspect of the present disclosure, a vehicle console assembly includes a body that defines a storage space. The body includes an upper rim. A support assembly is operable between a first position at a first end of the upper rim and a second position at a second end of the upper rim. The support assembly is operable between a folded armrest condition and a deployed tray condition. An actuation assembly is operably coupled to the support assembly. The actuation assembly includes at least one cable having coils. The at least one cable is coupled to the support assembly. A motor is configured to engage the coils of the at least one cable to translate the support assembly between the first position and the second position.

According to another aspect of the present disclosure, a power tray system for a center console includes a track. A flocked drive cable extends through the track. A motor has a drive gear configured to engage coils of the flocked drive cable. A support assembly is coupled to the flocked drive cable. The drive gear is configured to engage the coils of the flocked drive cable to drive movement of the flocked drive cable relative to the track and, consequently, translate the support assembly between first and second positions relative to the track. The support assembly is operable between a folded armrest condition and deployed tray condition.

According to another aspect of the present disclosure, a center console includes a body. A track is coupled to the body. A support assembly has side panels rotatably coupled to a connector panel. The side panels are operable between a folded condition over the connector panel and a deployed condition forming a continuous surface with the connector panel. An actuation assembly is operably coupled to the support assembly and the track. The actuation assembly includes a cable extending through the track and coupled to the support assembly. A motor has a drive gear. The drive gear is configured to engage the cable to translate the support assembly between first and second positions relative to the body.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
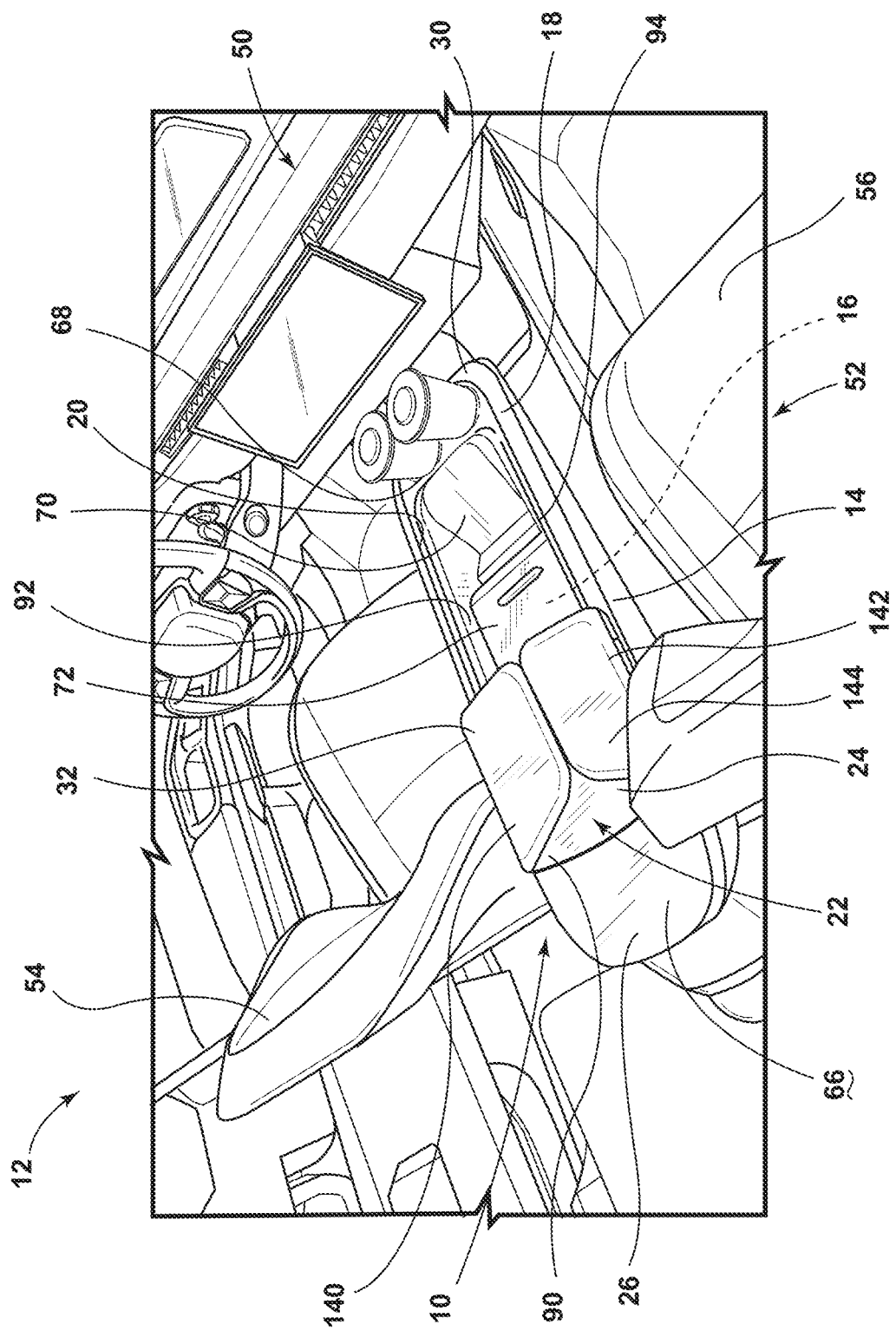
FIG. 1 is a side perspective view of a console assembly within a vehicle, with a support assembly in a first position and in a folded condition, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-10, reference numeral 10 generally designates a console assembly for a vehicle 12 that includes a body 14 defining a storage space 16. The body 14 includes an upper engagement portion or rim 18, which defines an opening 20 into the storage space 16. A support assembly 22 is operable between a first position 24 at a first end 26 of the upper rim 18 and a second position 28 at a second end 30 of the upper rim 18. The support assembly 22 is also operable between a folded armrest condition 32 and a deployed tray condition 34. An actuation assembly 36 is operably coupled to the support assembly 22. The actuation assembly 36 includes at least one cable 38 having coils 40. The at least one cable 38 is coupled to the support assembly 22. The actuation assembly 36 also includes a motor 42 configured to engage the coils 40 of the at least one cable 38 to translate the support assembly 22 between the first and second positions 24, 28.

Figure 2:
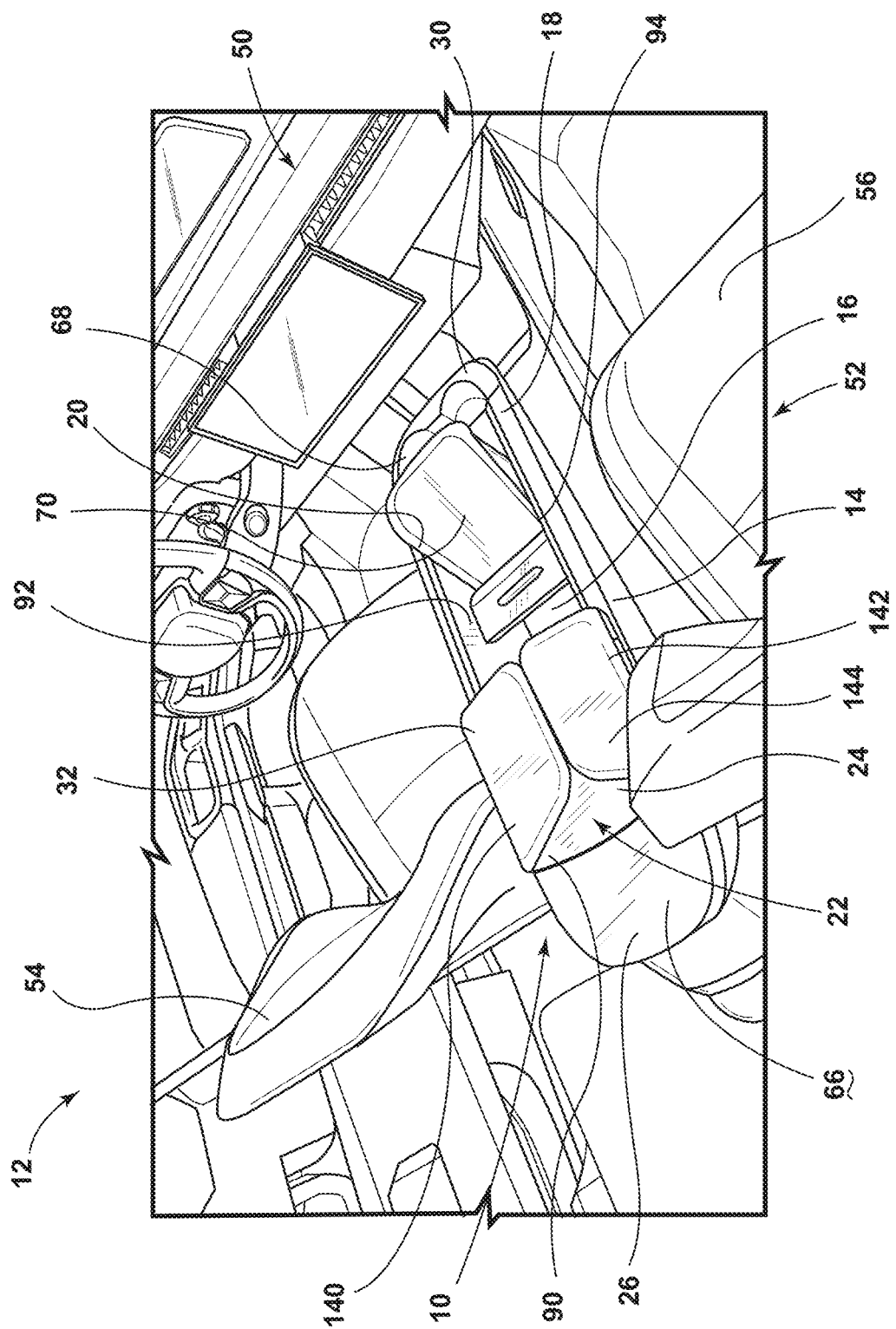
FIG. 2 is a side perspective view of a console assembly within a vehicle, with a support assembly in a first position and in a folded condition, according to the present disclosure.

Referring to FIGS. 1 and 2, the vehicle 12 includes an interior compartment 50 with at least one seating row 52. Any practical number of seating rows 52 may be included in the vehicle 12 without departing the teachings herein. The illustrated seating row 52 is a front seating row 52 that includes a driver seat 54 and a passenger seat 56 that are separated by the console assembly 10 (e.g., the center console 10).

The console assembly 10 includes the body 14 having the first end 26, which is generally a vehicle-rearward end, and the second end 30, which is generally a vehicle-forward end. The vehicle-rearward first end 26 includes a support surface 66, which is generally flat or smooth. The surface may be substantially rigid to provide support for items or may include a padded or cushioned material. At the vehicle-forward second end 30, the console assembly 10 defines cup holders 68.

The body 14 defines the storage space 16 and a receiving feature 70 extending at least partially into the storage space 16. The receiving feature 70 is generally disposed proximate to the cup holders 68 and may be configured for receiving items such as navigations, electronics, etc. The receiving feature 70 may extend from within the storage space 16 to a top surface of the upper rim 18, as illustrated in FIG. 1, or may extend beyond the top surface of the upper rim 18, as illustrated in FIG. 2.

As illustrated in FIG. 1, the storage space 16 may be closed by an inner door 72 to prevent access to the storage space 16. The inner door 72 may be configured to rotate or otherwise open to allow access to the storage space 16 and close to prevent access to the storage space 16. In such examples, the inner door 72 may divide the storage space 16, enclosing some or most of the storage space 16 below the inner door 72. The area of the storage space 16 above the inner door 72 may be an open cavity, which can be used for storing items.

In examples with the inner door 72, the inner door 72 is disposed below the support assembly 22. Accordingly, the support assembly 22 is configured to translate over the inner door 72. It is contemplated that the support assembly 22 does not substantially impinge on the movement of the inner door 72 for accessing the storage space 16.

As illustrated in FIG. 2, the storage space 16 may be a substantially open cavity below the support assembly 22, without the inner door 72 (FIG. 1). In such examples, the support assembly 22 may partially cover the storage space 16. The storage space 16 may be accessible around the support assembly 22. Each of the enclosed storage space 16 with the inner door 72 and the open storage space 16 may be utilized with each configuration of the receiving feature 70 or without the receiving feature 70.

Figure 3:
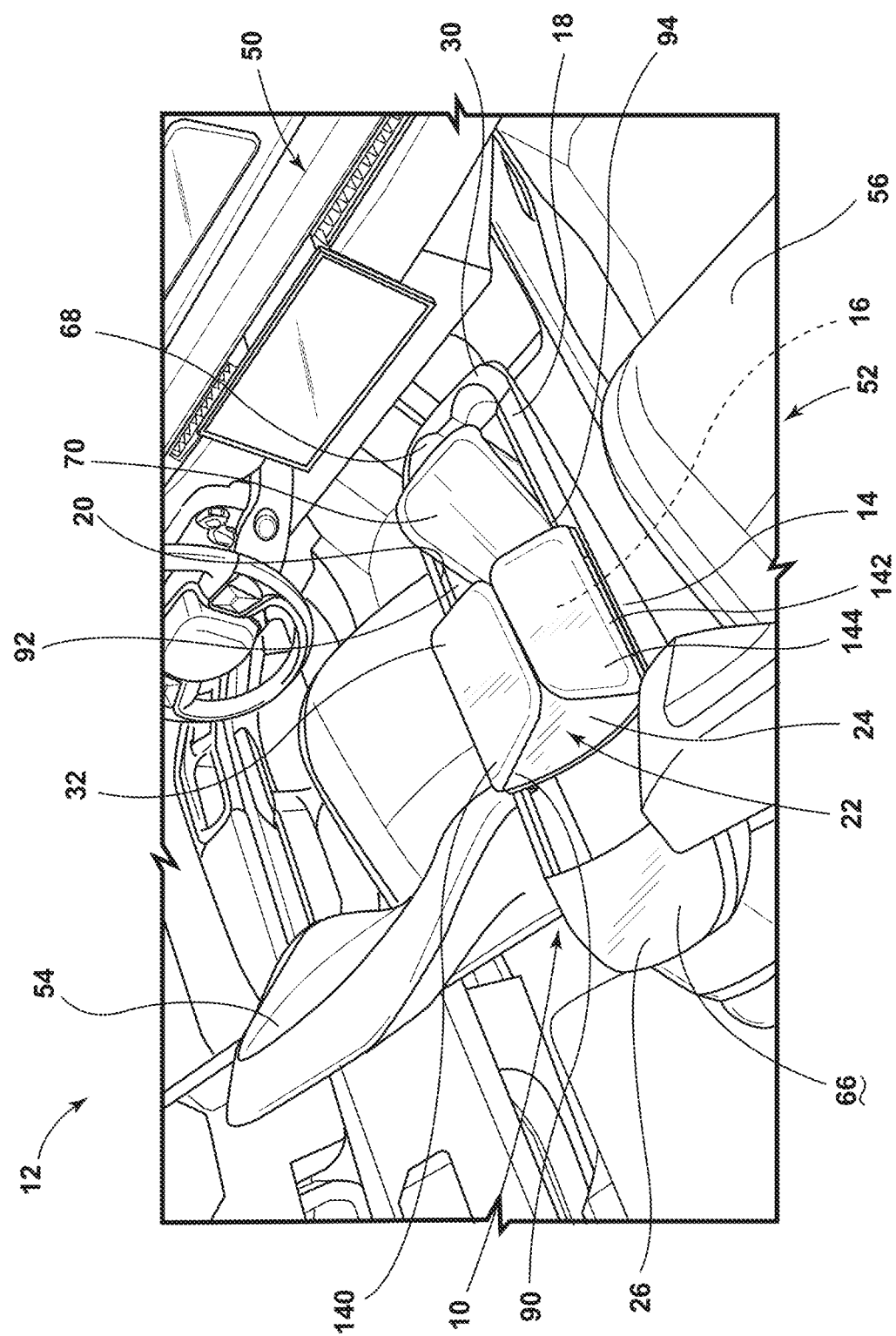
FIG. 3 is a side perspective view of a console assembly within a vehicle, with a support assembly in an intermediate position and in a folded condition, according to the present disclosure.
Figure 4:
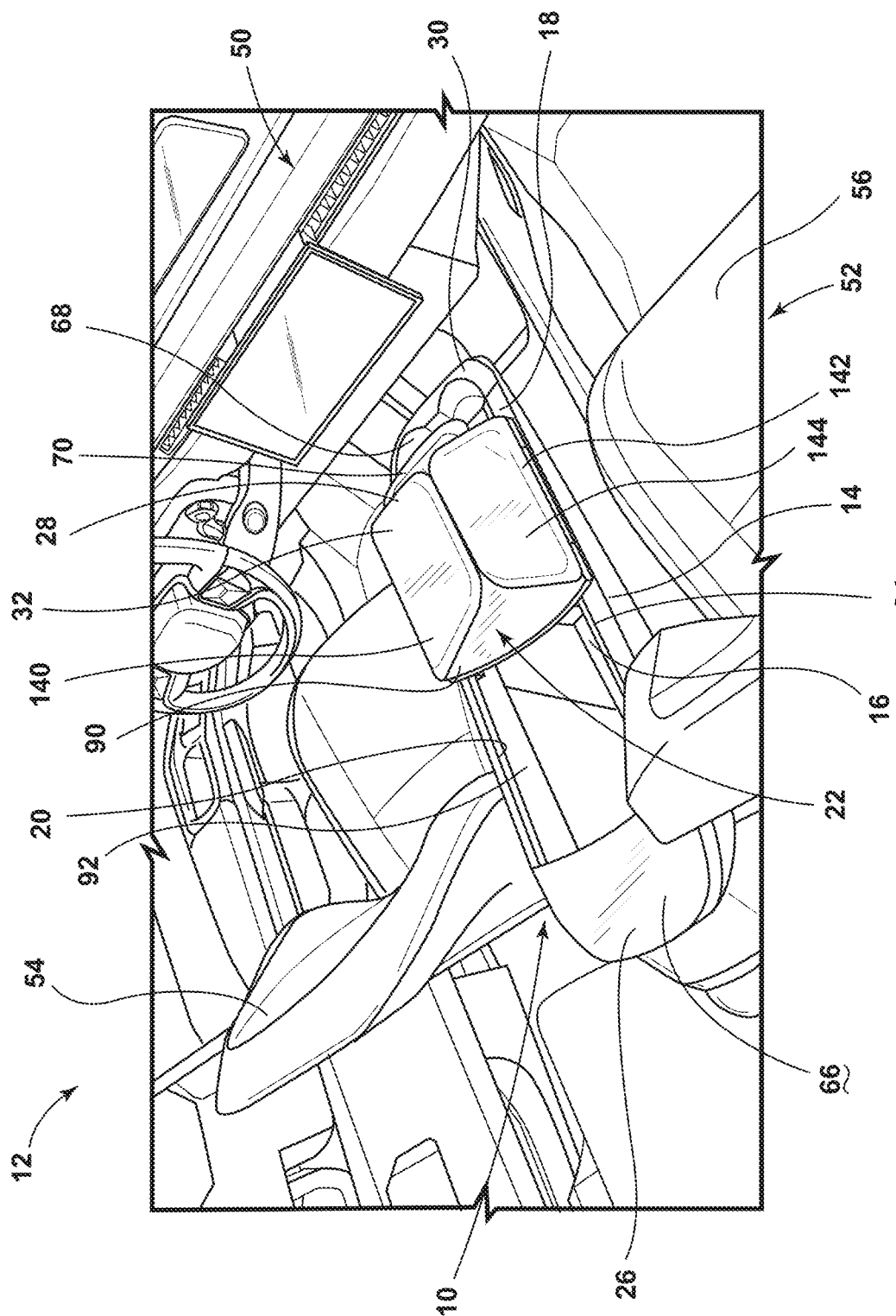
FIG. 4 is a side perspective view of a console assembly within a vehicle, with a support assembly in a second position and in a folded condition, according to the present disclosure.

Referring still to FIG. 2, as well as FIGS. 3 and 4, the console assembly 10 includes the support assembly 22, which is configured to translate between the first position 24 at the first end 26, illustrated in FIG. 2, and the second position 28 at the second end 30, illustrated in FIG. 4. The support assembly 22 is configured to translate over the storage space 16 and/or the inner door 72, depending on the configuration of the console assembly 10. At least a portion of the storage space 16 is accessible when the support assembly 22 is in the first position 24, in the second position 28, or therebetween. Further, the support assembly 22 may be configured to be stopped in an intermediate position between the first and second positions 24, 28, such as the position illustrated in FIG. 3.

Figure 5:
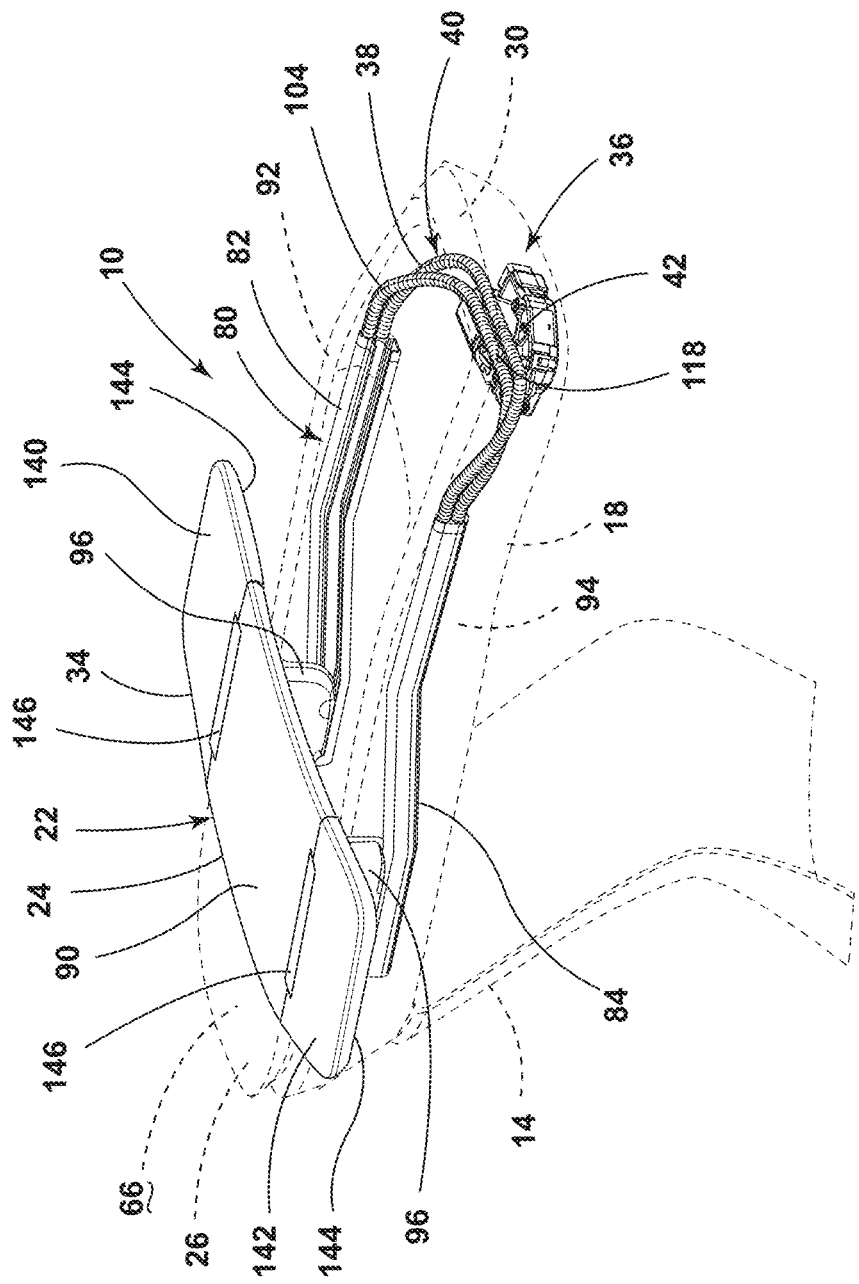
FIG. 5 is a side perspective view of a support assembly for a console assembly operably coupled with an actuation assembly, with the support assembly in a first position and in a deployed condition, according to the present disclosure.
Figure 6:
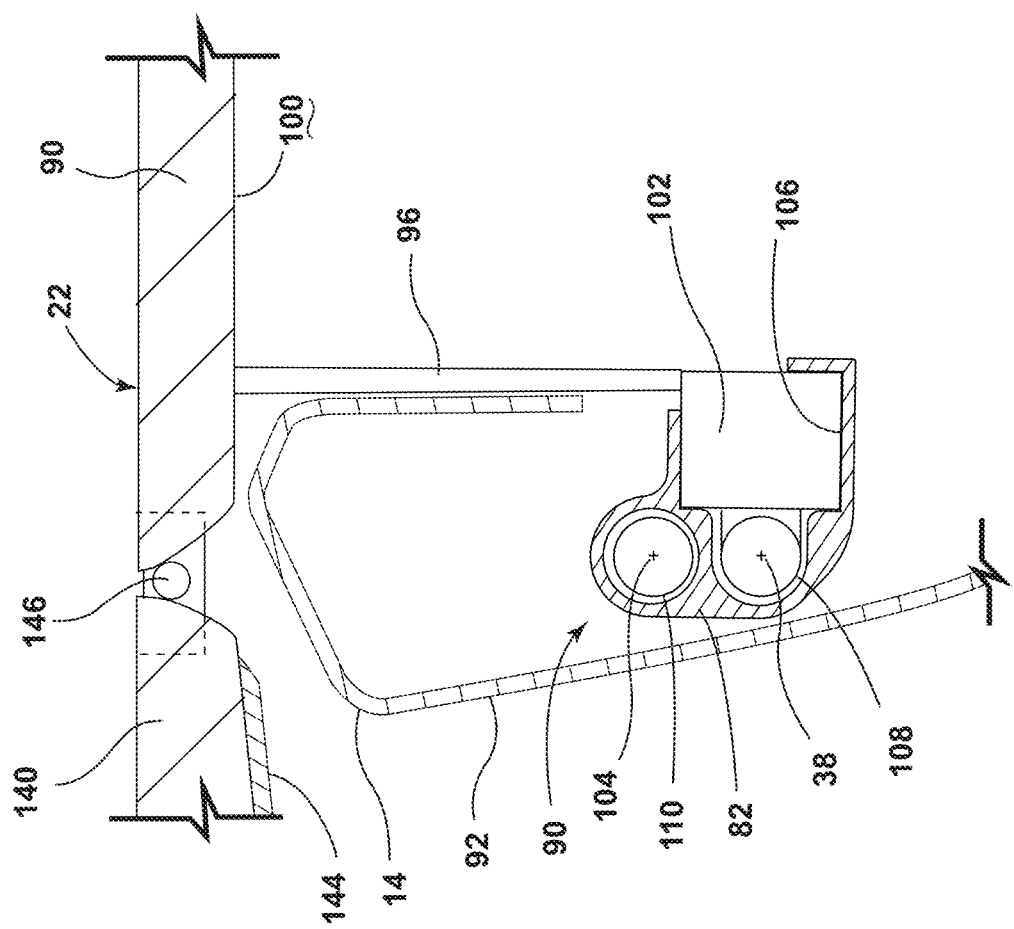
FIG. 6 is a partial cross-sectional view of a support assembly engaging an actuation assembly within a track for a console assembly, according to the present disclosure.
Figure 7:
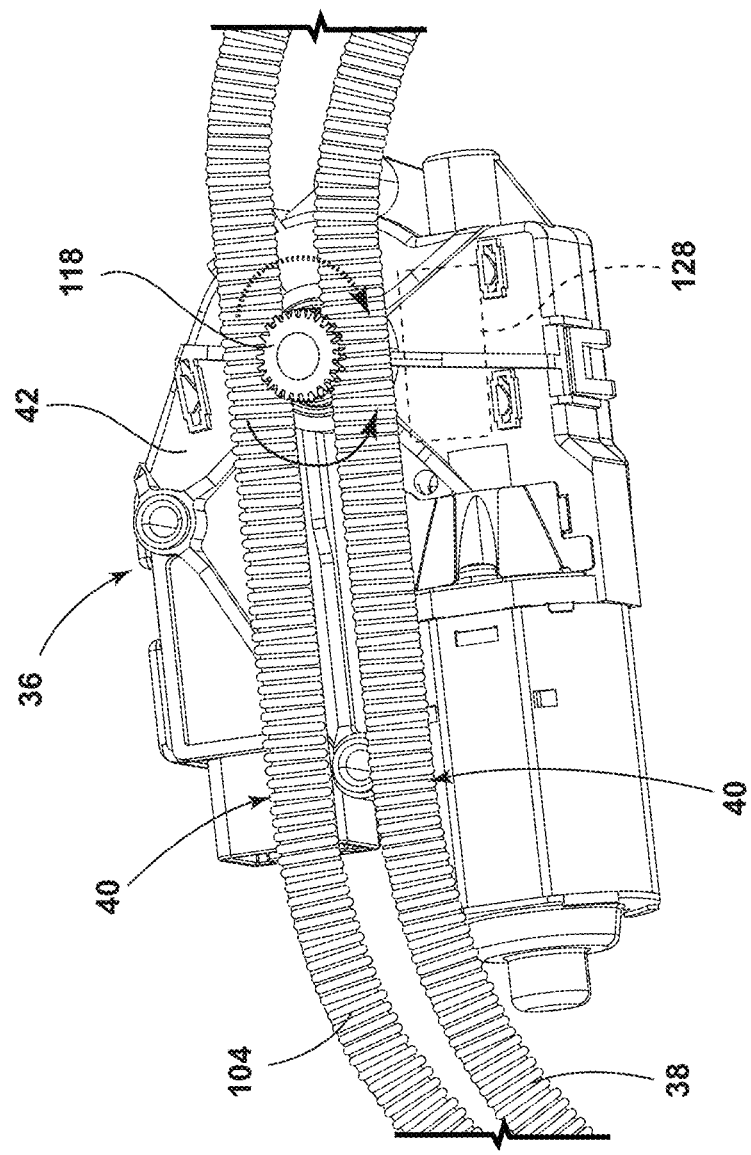
FIG. 7 is a partial side perspective view of an actuation assembly for a power tray system of a console support assembly, according to the present disclosure.

Referring still to FIGS. 2-4, as well as FIGS. 5-7, the support assembly 22 is driven between the first and second positions 24, 28 by the actuation assembly 36. The actuation assembly 36 extends along an inner surface of and/or within the upper rim 18. Generally, the actuation assembly 36 extends along the upper rim 18 about at least a portion of the opening 20 to the storage space 16.

The actuation assembly 36 engages a track 80 on the body 14 and the support assembly 22 to drive movement of the support assembly 22 along the track 80. The track 80 includes opposing track portions 82, 84 that extend in the fore-aft direction on the upper rim 18. As illustrated in FIG. 5, the track 80 may include an elevation change, such that a rear portion of the track 80 is lower than a front portion. This may be advantageous for positioning the support assembly 22 for the folded armrest condition 32 relative to the deployed tray condition 34. The track 80 may have horizontal portions at each end and a sloped portion therebetween, as illustrated in FIG. 5, or have a consistent slope. It is also contemplated that the track 80 may be linear without the elevation change or slope in an opposing direction (i.e., front portion lower than rear portion) depending on the configuration of the console assembly 10.

The support assembly 22 includes a connector panel 90 extending between the two track portions 82, 84 on opposing sides 92, 94 of the upper rim 18 and over the storage space 16. Engagement portions 96 extend from a bottom surface 100 of the connector panel 90, proximate to each side 92, 94, and into the storage space 16 to engage the track 80. The engagement portions 96 each include a drive feature 102, which are configured to engage the track 80 and the actuation assembly 36.

Each track portion 82, 84 is configured to guide movement of the respective drive feature 102 of the support assembly 22, as well as the drive cable 38 and a return cable 104 of the actuation assembly 36. Accordingly, each track portion 82, 84 includes a guide rail 106, which slidably receives the drive features 102 of the engagement portions 96, and two channels 108, 110 for the cables 38, 104. The first channel 108 for the drive cable 38 is open to the guide rail 106, allowing for a connection between the drive features 102 and the drive cable 38. The drive cable 38 is overmolded to each drive feature 102, forming a fixed connection therebetween. This fixed connection allows the support assembly 22 to move with the drive cable 38.

The return cable 104 extends through the second channel 110 and is separated from the guide rail 106, allowing the return cable 104 to move relative to the support assembly 22. The return cable 104 is generally excess cable length caused by movement of the drive cable 38 based on the configuration of the drive cable 38 and the position of the support assembly 22. The return cable 104 may be integrally formed with the drive cable 38 or separate cables 38, 104. While generally not directly fixed to the support assembly 22 within the track 80, the return cable 104 assists in moving the drive cable 38 and, consequently, the support assembly 22.

Referring still to FIGS. 2-8, the actuation assembly 36 extends around a portion of a perimeter of the opening 20 into the storage space 16. In the illustrated example in FIG. 5, the actuation assembly 36 forms a U-shape that extends along both sides 92, 94 and the second end 30 of the upper rim 18. It is also contemplated that the actuation assembly 36 may extend along the first end 26 of the upper rim 18 or the entire perimeter without departing from the teachings herein. As illustrated in FIG. 5, the motor 42 is disposed in or at the vehicle-forward second end 30 of the console assembly 10 and is configured to engage each of the drive cable 38 and the return cable 104.

Figure 8:
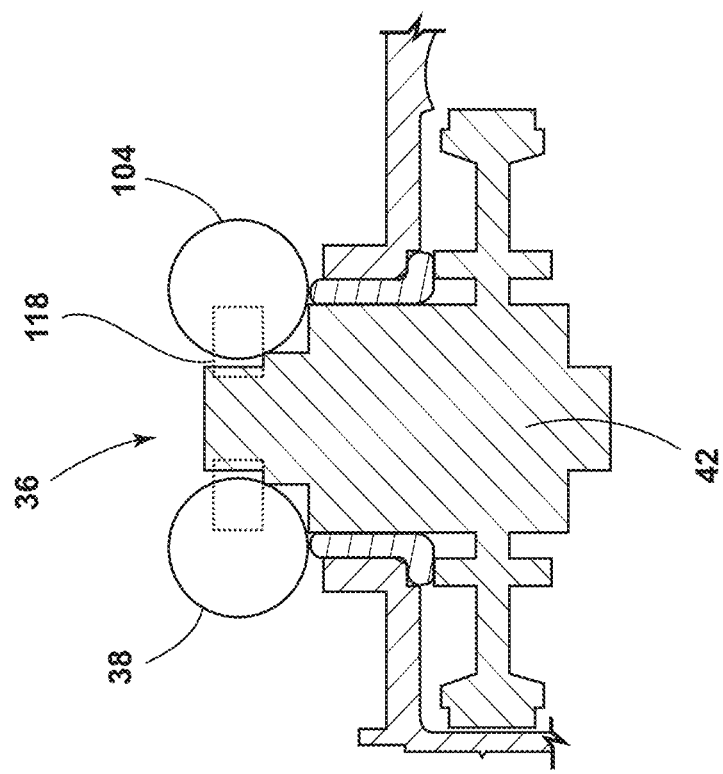
FIG. 8 is a partial cross-sectional view of a motor engaging cables for a power tray system of a console assembly, according to the present disclosure

As illustrated in FIGS. 7 and 8, the motor 42 includes a drive gear 118, which engages the drive and return cables 38, 104. The cables 38, 104 are generally configured as flocked cables 38, 104 having the coils 40. The coils 40 are arranged along at least a substantial portion of the length or the entire length of each of the cables 38, 104. The drive gear 118 engages the coils 40 to form a gear train, operating to drive the movement of the cables 38, 104 and, consequently, the support assembly 22. Generally, rotation of the drive gear 118 in a clockwise direction drives the support assembly 22 in the vehicle-forward direction from the first position 24 to the second position 28. Rotation of the drive gear 118, a counterclockwise direction drives the support assembly 22 in the vehicle-rearward direction from the second position 28 to the first position 24.

Figure 9:
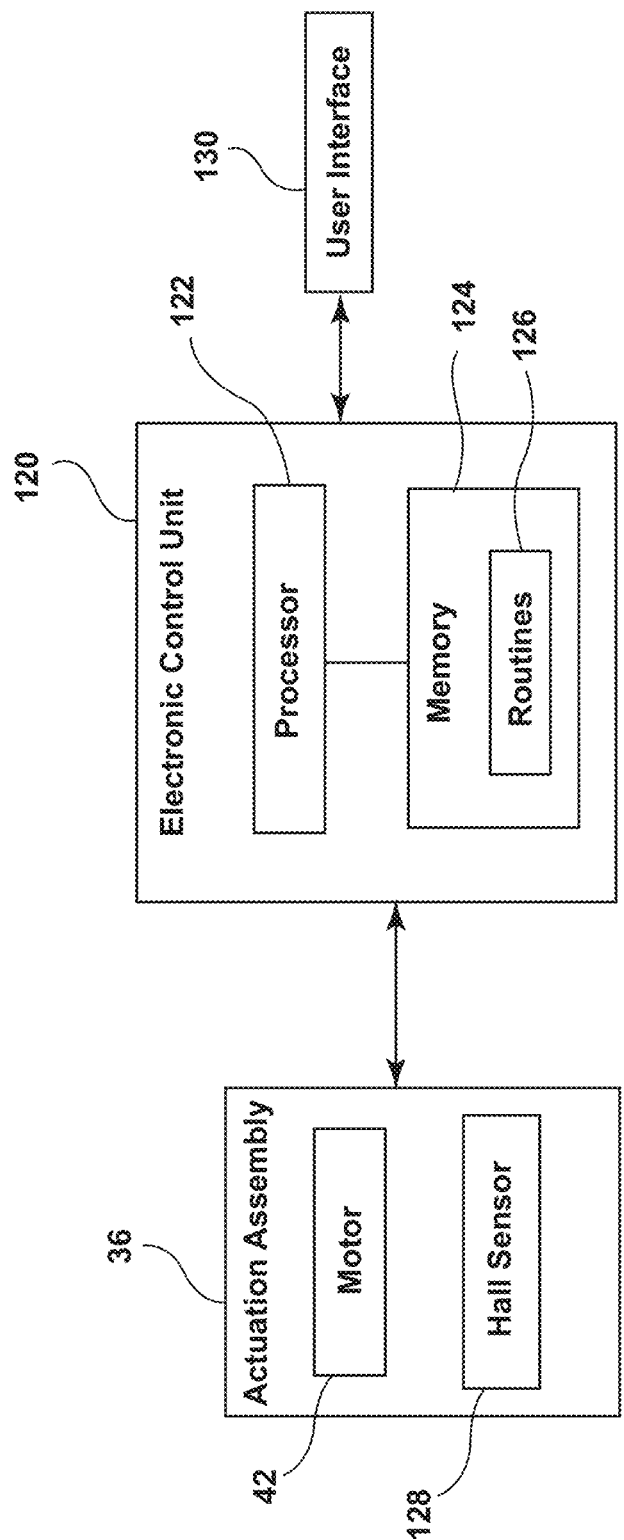
FIG. 9 is a block diagram of a power tray system, according to the present disclosure.

Referring still to FIGS. 7 and 8, as well as to FIG. 9, the motor 42 is operably coupled with an electronic control unit 120 (ECU), which may be the control unit for the vehicle 12 or may be a designated control unit for the console assembly 10. The electronic control unit 120 has a processor 122, a memory 124, and other control circuitry. Instructions or routines 126 are stored in the memory 124 and executable by the processor 122.

The ECU 120 is also in communication with a Hall sensor 128, which is communicatively coupled with the motor 42. The Hall sensor 128 is configured to sense or count the number of rotations of the motor 42, allowing the ECU 120 to determine the position of the support assembly 22. The ECU 120 is configured to monitor the sensed information from the Hall sensor 128 to stop the support assembly 22 in the first or second position 24, 28, as well as determine if there is an obstruction in the movement path. If there is an object in the movement path, the Hall sensor 128 is configured to sense and communicate a change in value and the ECU 120 may operate to stop or reverse the rotation of the motor 42. Accordingly, after detection of an obstruction, the support assembly 22 may be stopped or moved in an opposing direction away from the obstruction.

In various examples, the ECU 120 is configured to stop the support assembly 22 in an intermediate position between the first and second positions 24, 28. These intermediate positions may be stored within the ECU 120 and may be determined based on rotations sensed by the Hall sensor 128.

The ECU 120 may also be communicatively coupled to a user interface 130, which may be a screen, button, or other interfaces within the vehicle 12 or part of a remote device. A user may control the position of the support assembly 22 by inputting a position for the support assembly 22 through the user interface 130. The ECU 120 is configured to receive the input and adjust the support assembly 22 accordingly.

Figure 10:
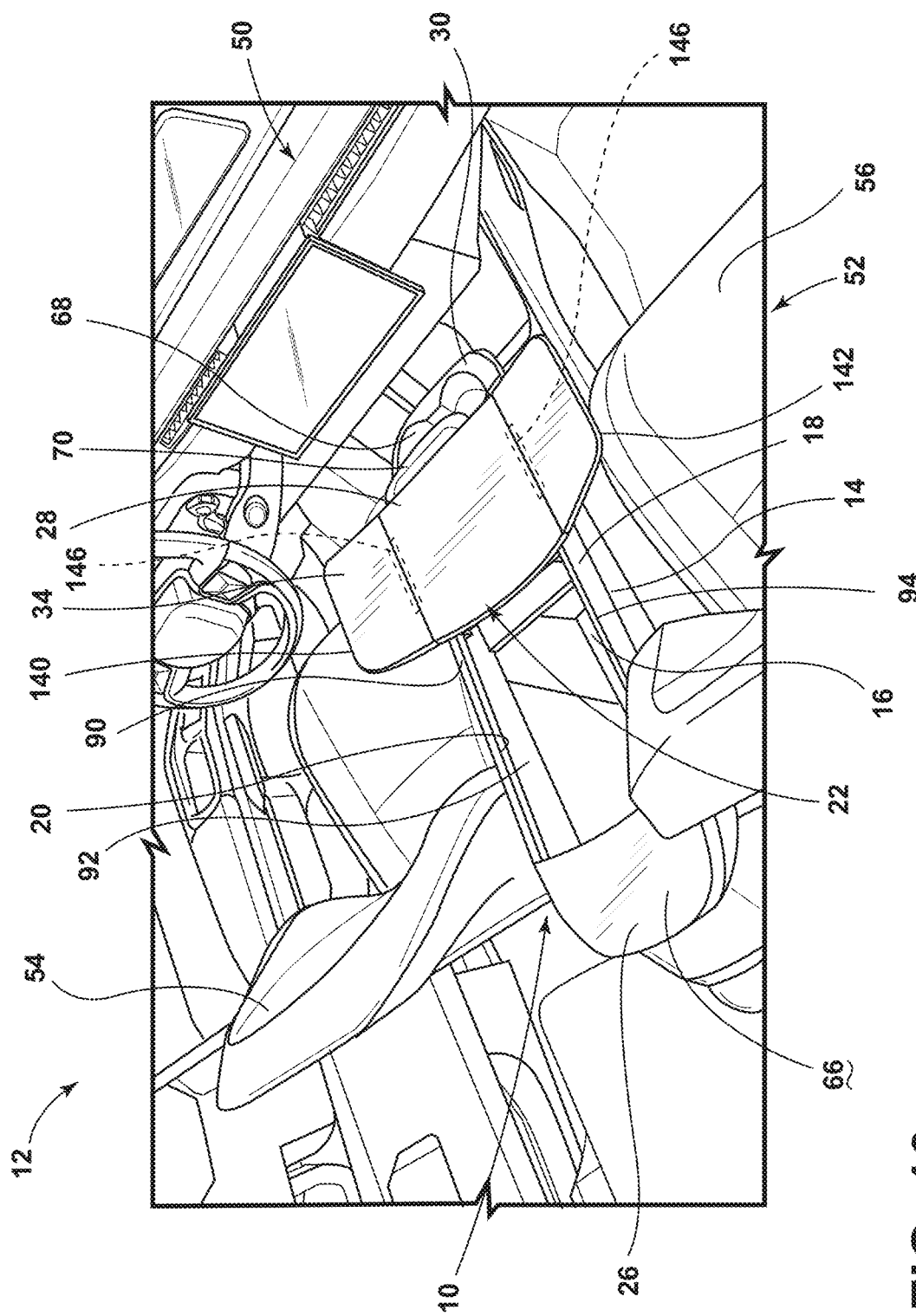
FIG. 10 is a side perspective view of a console assembly within a vehicle, with a support assembly in a second position and in a deployed condition, according to the present disclosure.

Referring again to FIGS. 2 and 4, as well as FIG. 10, the support assembly 22 is also operable between the folded armrest condition 32 and the deployed tray condition 34. Generally, the support assembly 22 is disposed in the folded armrest condition 32 when in the first position 24 and during movement and in the deployed tray condition 34 when in the second position 28. However, the support assembly 22 may be configured to be in the folded armrest condition 32 or the deployed tray condition at any position along the upper rim 18 without departing from the teachings herein.

The support assembly 22 includes the connector panel 90, which spans over the storage space 16 between the first and second sides 92, 94 of the console assembly 10. Accordingly, the connector panel 90 extends the width of the storage space 16. Two side panels 140, 142 are rotatably coupled to the connector panel 90 and are configured to rotate between the folded condition 32 and the deployed condition 34. The side panels 140, 142 are coupled to opposing lateral sides of the connector panel 90 proximate the sides 92, 94 of the body 14, respectively.

When the first and second side panels 140, 142 are disposed in the folded condition 32, the first and second side panels 140, 142 are disposed over and rest on top of the connector panel 90 adjacent to one another. In the folded condition 32, the width of the support assembly 22 is substantially equal to the width of the connector panel 90. The side panels 140, 142 may or may not cover the entirety of the top surface of the connector panel 90 when in the folded condition 32.

The side panels 140, 142 also include a cushion 144, which may be a pad, padded layer, etc. When the side panels 140, 142 are in the folded condition 32, the cushions 144 are on upper surfaces of the side panels 140, 142 and accessible for the user to rest his or her arm. Accordingly, the side panels 140, 142 are configured to operate as armrests for passengers in the driver and passenger seats 54, 56 of the seating row 52.

When the side panels 140, 142 are opened into the deployed tray condition 34, the side panels 140, 142 and the connector panel 90 form a substantially continuous and generally flat surface configured to operate as a tray or table. Accordingly, the width of the support assembly 22 is the combined width of the connector panel 90 and both side panels 140, 142 adjacent to one another. The cushions 144 are also disposed on a lower surface of the side panels 140, 142 when the side panels 140, 142 are deployed, providing for a more rigid and more stable surface for the tray or table.

In the deployed condition 34, the support assembly 22 may have a curved vehicle-rearward edge, which may provide more space for the passengers in the seating row 52 when the side panels 140, 142 are deployed. While both side panels 140, 142 are illustrated in the deployed condition 34 in FIG. 10, it is contemplated that one side panel 140 may be disposed in the folded condition 32 and the other side panel 142 may be in the deployed condition 34 without departing the teachings herein.

The tray or table formed by the support assembly 22 may have a width in a range between 400 mm and 600 mm in the cross-car direction. Generally, the tray may be a sufficient size to support electronics, such as a tablet or laptop, to provide a mobile workstation or hold a meal. The support assembly 22 may be any practicable size for providing the armrest and the tray.

Referring again to FIGS. 6 and 10, the side panels 140, 142 are rotatably coupled to the connector panel 90. In various examples, the side panels 140, 142 may be coupled to the connector panel 90 via hinge assemblies 146, respectively. In such examples, the hinge assemblies 146 may form part of the continuous tray surface. In such examples, the hinge assemblies 146 may be coplanar with the connector panel 90 and the side panels 140, 142 in the deployed condition 34, may be between or within the connector panel 90 and the side panels 140, 142, or may be below the tray surface. Additionally or alternatively, the side panels 140, 142 may be coupled to the connector panel 90 via living hinges. Accordingly, the engagement between the side panels 140, 142 and the connector panel 90 may not substantially impinge the tray surface of the support assembly 22.

In various aspects, the side panels 140, 142 may be manually rotated between the folded and deployed conditions 32, 34. The user may rotate the side panels 140, 142 when the support assembly 22 is at any position. Additionally or alternatively, an actuator may be configured to rotate the side panels 140, 142 between the folded and deployed conditions 32, 34. Further, the side panels 140, 142 may be locked in certain positions or during movement of the support assembly 22 and unlocked at other positions. In such examples, the ECU 120 may be configured to determine the position of the support assembly 22 based on the Hall sensor 128 and unlock the support assembly 22 to allow the support assembly 22 to be deployed.

Referring to FIGS. 1-10, the support assembly 22 is configured to provide the armrest and the tray or table for the passengers in the seating row 52. When the support assembly 22 is operating as the tray in the deployed condition 34, the support assembly 22 may provide a mobile workstation, which may be advantageous for providing space for an occupant of the vehicle 12 to work while the vehicle 12 is parked and stationary, or provide a place to eat lunch while at a worksite. In the current regulatory framework, it is contemplated that the tray configuration of the support assembly 22 for providing a work station or lunch table is used when the vehicle 10 is parked and stationary. However, it is anticipated that technology and the regulatory framework may evolve in the future to where using the support assembly 22 operated as a tray in a moving vehicle becomes safe and permissible. Accordingly, the powered tray system of the console assembly 10 may be utilized in accordance with current safety and regulatory framework and guidelines.

The support assembly 22 is integrated into the console assembly 10 and provides a convenient and mobile workspace. The support assembly 22 is adjusted between the first and second positions 24, 28 by the actuation assembly 36 and, in at least some examples, between the folded and deployed conditions 32, 34 by the actuator. Accordingly, the console assembly 10 includes the support assembly 22 providing a power tray or table system. In the illustrated example, the console assembly 10 is disposed between the driver seat 54 and the passenger seat 56 of the front seating row 52. However, it is contemplated that the console assembly 10 may be positioned in any practicable location within the interior compartment 50 of the vehicle 12 without departing from the teachings herein.

The vehicle 12 is a wheeled motor vehicle 12, which may be a sedan, a sport-utility vehicle, a truck, a van, a crossover, and/or other styles of vehicle 12. The vehicle 12 may be a manually operated vehicle 12 (e.g., operated with a human driver), a fully autonomous vehicle 12 (e.g., operated without a human driver), or a partially autonomous vehicle 12 (e.g., operated with or without a human driver). Additionally, the vehicle 12 would be utilized for personal and/or commercial purposes, such as ride providing services (e.g., chauffeuring) and/or ridesharing services.

Use of the present device may provide a variety of advantages. For example, the console assembly 10 includes an integrated power armrest-tray system. Additionally, the support assembly 22 is driven by the actuation assembly 36 between the first position 24 the second position 28 relative to the body 14 of the console assembly 10. Also, the support assembly 22 is configured to translate over the storage space 16, which may provide different access points for the storage space 16. Moreover, the actuation assembly 36 may use flocked cables 38, 104 and a drive gear 118 to form a gear train to translate the support assembly 22 fore and aft. Further, the support assembly 22 is operable between the folded condition 32 to provide an armrest for passengers and the deployed condition 34 to provide a table or tray surface. Also, the side panels 140, 142 may be manually adjusted or actuated between the folded and the deployed conditions 32, 34. Moreover, the support assembly 22 and the actuation assembly 36 are integrated into the console assembly 10. Additional benefits or advantages may be realized and/or achieved.

According to various examples, a vehicle console assembly includes a body that defines a storage space. The body includes an upper rim. A support assembly is operable between a first position at one end of the upper rim and a second position at a second end of the upper rim. The support assembly is operable between a folded armrest condition and a deployed tray condition. An actuation assembly is operably coupled to the support assembly. The actuation assembly includes at least one cable having coils.

The at least one cable is coupled to the support assembly. A motor is configured to engage the coils of the at least one cable to translate the support assembly between the first position and the second position. Embodiments of the present disclosure may include one or a combination of the following features:
  the support assembly includes a connector panel extending between opposing sides of the rim; a first side panel rotatably coupled to a first side of the connector panel;
  a second side panel rotatably coupled to a second side of the connector panel;
  the first and second side panels are disposed on the connector panel in the folded armrest condition and disposed adjacent to the connector panel in the deployed tray condition;
  the support assembly is in the folded armrest condition when in the first position on the upper rim and in the deployed tray condition when in the second position on the upper rim;
  the at least one cable includes a drive cable and a return cable;
  the support assembly includes an engagement portion having a drive feature, and wherein the drive feature is fixedly coupled to the drive cable;
  a track extending along the upper rim of the body;
  at least one cable extends through a channel defined by the track;
  the support assembly includes an engagement portion extending into the storage space;
  the engagement portion includes a drive feature slidably received in a guide rail of the track;
  an electronic control unit communicatively coupled to the actuation assembly;
  the actuation assembly includes a Hall sensor configured to sense rotations of the motor; and
  the electronic control unit is configured to monitor the sensed rotations to determine a position of the support relative to the upper rim According to various examples, a power tray system for a center console includes a track. A flocked drive cable extends through the track. A motor has a drive gear configured to engage coils of the flocked drive cable. A support assembly is coupled to the flocked drive cable. The drive gear is configured to engage the coils of the flocked drive cable to drive movement of the flocked drive cable relative to the track and, consequently, translate the support assembly between first and second positions relative to the track, and wherein the support assembly is operable between a folded armrest condition and deployed tray condition. Embodiments of the present disclosure may include one or a combination of the following features:
  the support assembly includes side panels;
  each side panel includes a cushion on one side thereof;
  the cushions are on upper surfaces of the side panels when the side panels are in the folded armrest condition;
  the cushions are on lower surfaces of the side panels when the side panels are in the deployed tray condition;
  the support assembly includes: a connector panel and side panels rotatably coupled to the connector panel;
  the side panels are disposed on the connector panel in the folded armrest condition and adjacent to the connector panel in the deployed tray condition;
  the track includes a first track portion and a second track portion;
  the connector panel extends between the first and second track portions;
  the connector panel includes engagement portions that have drive features coupled to the flocked drive cable within guide rails of the first and second track portions, respectively;
  the track is coupled to a body defining a storage space; and
  the support assembly is configured to translate over the storage space between the first and second positions.

According to various examples, a center console includes a body. A track is coupled to the body. A support assembly has side panels rotatably coupled to a connector panel. The side panels are operable between a folded condition over the connector panel and a deployed condition forming a continuous surface with the connector panel. An actuation assembly is operably coupled to the support assembly and the track. The actuation assembly includes a cable extending through the track and coupled to the support assembly. A motor has a drive gear. The drive gear is configured to engage the cable to translate the support assembly between first and second positions relative to the body. Embodiments of the present disclosure may include one or a combination of the following features:
  the cable is a flocked cable and the drive gear is configured to engage coils of the flocked cable;
  the body defines a storage space;
  the support assembly translates over the storage space between the first and second positions;
  the support assembly is in the folded condition when in the first position on the body and in the deployed condition when in the second position of the body;
  the side panels are coupled to the connector panel via hinge assemblies, respectively, and wherein the side panels, the connector panel, and the hinge assemblies form a continuous surface when in the deployed condition; and
  the connector panel includes engagement portions extending proximate to sides of the body within a storage space defined by the body to engage the track.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle console assembly, comprising:
   a body defining a storage space, wherein the body includes an upper rim;
   a track extending along the upper rim of the body;
   a support assembly operable between a first position at a first end of the upper rim and a second position at a second end of the upper rim, wherein the support assembly is operable between a folded armrest condition and a deployed tray condition, wherein the support assembly includes an engagement portion extending into the storage space, and wherein the engagement portion includes a drive feature slidably received in a guide rail of the track; and
   an actuation assembly operably coupled to the support assembly, wherein the actuation assembly includes:
      at least one cable having coils, wherein the at least one cable is coupled to the support assembly and extends through a first channel defined by the track; and
      a motor configured to engage the coils of the at least one cable to translate the support assembly between the first position and the second position.

2. The vehicle console assembly of claim 1, wherein the support assembly includes:
   a connector panel extending between opposing sides of the rim;
   a first side panel rotatably coupled to a first side of the connector panel; and
   a second side panel rotatably coupled to a second side of the connector panel, wherein the first and second side panels are disposed on the connector panel in the folded armrest condition and disposed adjacent to the connector panel in the deployed tray condition.

3. The vehicle console assembly of claim 1, wherein the support assembly is in the folded armrest condition when in the first position on the upper rim and in the deployed tray condition when in the second position on the upper rim.

4. The vehicle console assembly of claim 1, wherein the at least one cable includes a drive cable and a return cable, and wherein the drive feature is fixedly coupled to the drive cable.

5. The vehicle console assembly of claim 1, further comprising:
   an electronic control unit communicatively coupled to the actuation assembly, wherein the actuation assembly includes a Hall sensor configured to sense rotations of the motor, and wherein the electronic control unit is configured to monitor sensed rotations to determine a position of the support assembly relative to the upper rim.

6. The vehicle console assembly of claim 4, wherein the drive cable extends through the first channel defined by the track, and wherein the return cable extends through a second channel defined by the track.

7. The vehicle console assembly of claim 6, wherein the track includes a pair of track portions on opposing sides of the upper rim, and wherein the at least one cable extends through each of the pair of track portions.

8. A power tray system for a center console, comprising:
   a track including a first track portion and a second track portion spaced from the first track portion;
   a flocked drive cable extending through the first track portion;
   a flocked return cable extending through the second track portion, wherein the flocked return cable is connected to the flocked drive cable;
   a motor having a drive gear configured to engage coils of the flocked drive cable; and
   a support assembly coupled to the flocked drive cable, wherein the drive gear is configured to engage the coils of the flocked drive cable to drive movement of the flocked drive cable relative to the track and, consequently, translate the support assembly between first and second positions relative to the track, and wherein the support assembly is operable between a folded armrest condition and deployed tray condition.

9. The power tray system of claim 8, wherein the support assembly includes side panels, and wherein each side panel includes a cushion on one side thereof, and wherein the cushions are on upper surfaces of the side panels when the side panels are in the folded armrest condition.

10. The power tray system of claim 9, wherein the cushions are on lower surfaces of the side panels when the side panels are in the deployed tray condition.

11. The power tray system of claim 8, wherein the support assembly includes:
   a connector panel; and
   side panels rotatably coupled to the connector panel, wherein the side panels are disposed on the connector panel in the folded armrest condition and adjacent to the connector panel in the deployed tray condition.

12. The power tray system of claim 11, wherein the connector panel extends between the first and second track portions.

13. The power tray system of claim 12, wherein the connector panel includes an engagement portion that has a drive feature coupled to the flocked drive cable within a guide rail of the first track portion.

14. The power tray system of claim 13, wherein the track is coupled to a body defining a storage space, wherein the engagement portion of the connector panel extends into the storage space, and wherein the support assembly is configured to translate over the storage space between the first and second positions.

15. A center console, comprising:
   a body defining a storage space;
   a track coupled to the body;

a support assembly having side panels rotatably coupled to a connector panel, wherein the side panels are operable between a folded condition over the connector panel and a deployed condition forming a continuous surface with the connector panel, wherein the support assembly includes an engagement portion extending into the storage space, and wherein the engagement portion engages the track; and an actuation assembly operably coupled to the support assembly and the track, wherein the actuation assembly includes:

a cable extending through the track and coupled to the support assembly; and a motor having a drive gear, wherein the drive gear is configured to engage the cable to translate the support assembly between first and second positions relative to the body.

16. The center console of claim 15, wherein the cable is a flocked cable and the drive gear is configured to engage coils of the flocked cable.

17. The center console of claim 15, wherein the support assembly translates over the storage space between the first and second positions.

18. The center console of claim 15, wherein the support assembly is in the folded condition when in the first position on the body and in the deployed condition when in the second position on the body.

19. The center console of claim 15, wherein the side panels are coupled to the connector panel via hinge assemblies, respectively, and wherein the side panels, the connector panel, and the hinge assemblies form a continuous surface when in the deployed condition.

20. The center console of claim 15, wherein the cable extends uninterrupted along a first side of the body, an end of the body, and a second side of the body.

* * * * *